United States Patent [19]

Wilson et al.

[11] Patent Number: 5,173,562

[45] Date of Patent: Dec. 22, 1992

[54] LIQUID CRYSTAL POLYMER COMPOSITION CONTAINING BISPHENOL A IN COMBINATION WITH 4,4'-THIODIPHENOL

[75] Inventors: Donald R. Wilson, Glasser; Edgar A. Blair, Pennington; Sue H. Graham, Lawrenceville, all of N.J.

[73] Assignee: Chisso America Inc., New York, N.Y.

[21] Appl. No.: 605,368

[22] Filed: Oct. 29, 1990

[51] Int. Cl.$^5$ ................. C08G 63/02; C08G 63/18
[52] U.S. Cl. .................... 528/193; 528/176; 528/185; 528/194
[58] Field of Search ............ 528/185, 176, 193, 194

[56] References Cited

U.S. PATENT DOCUMENTS

| | | | |
|---|---|---|---|
| 3,398,212 | 8/1968 | Jackson et al. | 260/860 |
| 3,637,595 | 1/1972 | Cottis et al. | 260/47 C |
| 3,821,136 | 6/1974 | Hudgin et al. | 260/9 |
| 3,822,238 | 7/1974 | Blair et al. | 260/75 |
| 3,830,764 | 8/1974 | Hudgin et al. | 260/23 |
| 3,865,622 | 2/1975 | Blair | 117/161 |
| 3,975,350 | 8/1976 | Hudgin et al. | 260/30.4 |
| 3,981,856 | 9/1976 | Hudgin et al. | 526/4 |
| 3,997,624 | 12/1976 | Hudgin | 260/683.15 |
| 4,043,980 | 8/1977 | Baron et al. | 260/47 |
| 4,067,852 | 1/1978 | Calundann | 260/47 |
| 4,075,173 | 2/1978 | Maruyama et al. | 260/47 |
| 4,118,372 | 10/1978 | Schaefgen | 528/190 |
| 4,159,365 | 6/1979 | Payet | 428/364 |
| 4,171,699 | 10/1979 | Jones | 128/218 |
| 4,219,629 | 8/1980 | Storm | 525/167 |
| 4,260,548 | 4/1981 | Hudgin | 260/346.74 |
| 4,296,232 | 10/1981 | Maresca et al. | 528/179 |

(List continued on next page.)

*Primary Examiner*—Morton Foelak
*Assistant Examiner*—T. Mosley
*Attorney, Agent, or Firm*—Sheldon H. Parker

[57] ABSTRACT

The invention relates to thermotropic liquid crystalline polymer compositions of the general formula:

$$-(CO-C_6H_4O)_m-(CO-C_6H_4-CO)_n$$

$$-(O-C_6H_4-X)_p-(O-C_6H_4-C(CH_3)_2-C_6H_4-O)_q-(O-C_6H_4-S-C_6H_4-O)_t-$$

where substantially all aromatic substituents are para to one another, where
—X— can be either —O— or —NH—, and
m, n, p, q and t are mole fractions totaling 1.0,
where
m is 0 to 0.75,
m plus 2p is 0.5 to 0.75,
n is 0.125 to 0.5,
p is 0 to 0.375,
q is 0.125 to 0.25,
n equals p plus q plus t, and
t is greater than 0.0125, but equal to no greater than 90% of q plus t.

Preferably X is —O—, m is from 0.5 to 0.75 and p is less than 0.05. Alternatively, m is less than 0.1 and p is from 0.25 to 0.375. The thermotropic liquid crystalline polymer composition is the reaction product of the copolymerization of:
a) p-Hydroxybenzoic acid,
b) a member selected from the group consisting of hydroquinone and p-aminophenol,
c) Bisphenol A,
d) 4,4'-thiodiphenol, and
e) terephthalic acid,
wherein the thiodiphenol is present in an amount at least equal to 1.25 mole % of the total composition, the Bisphenol A is present in an amount at least equal to 12.5 mole %, and the concentration of the thiodiphenol plus Bisphenol A is up to about 25 mole %.

29 Claims, 2 Drawing Sheets

COMPOSITION MAP OF HBA/TA/HQ/BPA COPOLYMERS AND THERMAL PROPERTIES
(Tm, Ts)

U.S PATENT DOCUMENTS

| | | | |
|---|---|---|---|
| 4,316,004 | 2/1982 | Imai et al. | 528/126 |
| 4,377,681 | 3/1983 | Deex | 528/193 |
| 4,426,514 | 1/1984 | Krishnan et al. | 528/284 |
| 4,430,485 | 2/1984 | Mark | 525/439 |
| 4,444,980 | 4/1984 | Deex | 528/193 |
| 4,469,883 | 9/1984 | Hsu et al. | 560/131 |
| 4,477,647 | 10/1984 | Mark et al. | 528/176 |
| 4,487,916 | 12/1984 | Irwin | 528/193 |
| 4,495,311 | 1/1985 | Hudgin et al. | 523/126 |
| 4,582,872 | 4/1986 | Hudgin et al. | 524/439 |
| 4,639,396 | 1/1987 | Semsarzadeh | 428/373 |
| 4,678,825 | 7/1987 | Rosenfeld | 524/83 |
| 4,680,371 | 7/1987 | Rosenfeld et al. | 528/179 |
| 4,741,955 | 5/1988 | Saito et al. | 428/325 |
| 4,803,236 | 2/1989 | Rosenfeld | 524/83 |
| 4,829,113 | 5/1989 | Rosenfeld | 524/128 |
| 4,868,104 | 8/1989 | Kurn et al. | 435/6 |
| 4,868,122 | 4/1989 | Kominek et al. | 435/285 |
| 4,868,123 | 9/1989 | Berson | 435/290 |
| 4,868,124 | 9/1989 | Rietschel et al. | 435/311 |
| 4,868,125 | 9/1989 | Nishi et al. | 435/320 |
| 4,877,548 | 10/1989 | Kitano et al. | 252/299.63 |
| 4,877,549 | 10/1989 | Sawada et al. | 252/299.63 |
| 4,893,886 | 1/1990 | Ashkin et al. | 350/1.1 |

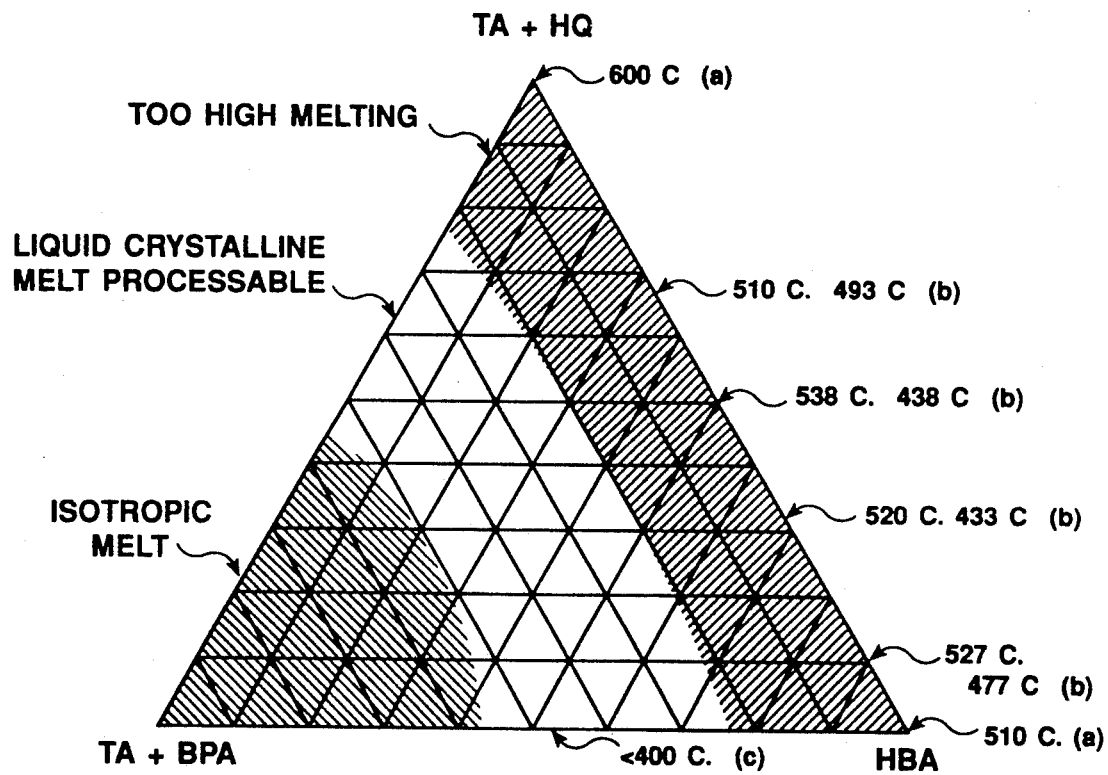
COMPOSITION MAP OF HBA/TA/HQ/BPA
COPOLYMERS AND THERMAL PROPERTIES
(Tm, Ts)
FIGURE I

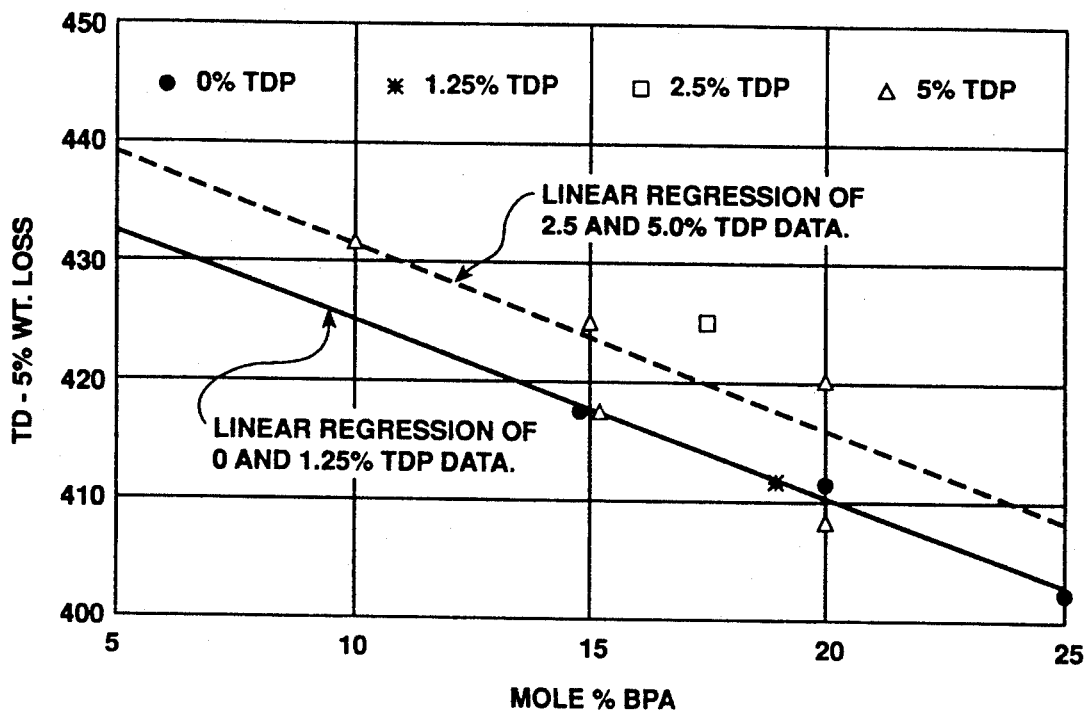
EFFECT OF BPA ON THERMAL DECOMPOSITION WITH VARYING LEVELS OF TDP
FIGURE II
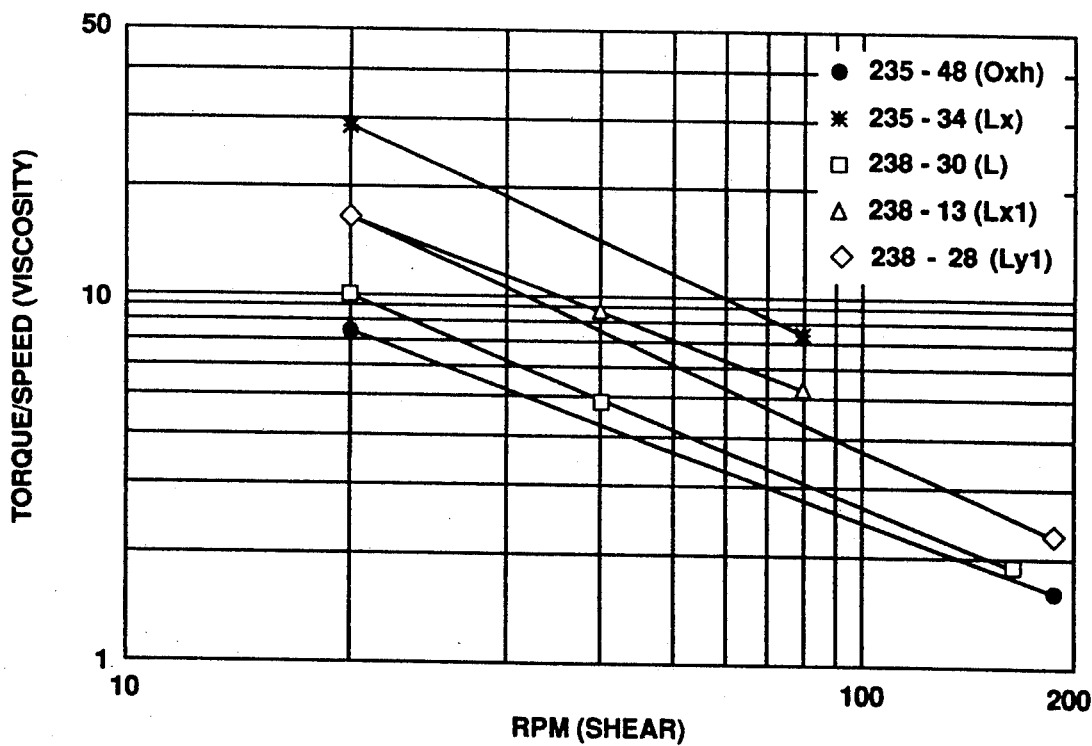
BRABENDER RHEOLOGY DATA
FIGURE III

LIQUID CRYSTAL POLYMER COMPOSITION CONTAINING BISPHENOL A IN COMBINATION WITH 4,4'-THIODIPHENOL

BACKGROUND OF THE INVENTION

1. Field of the Invention

This invention relates to thermotropic (melt processable) liquid crystalline polymers (LCP's) and more specifically to aromatic polyesters containing Bisphenol A (BPA) in combination with 4,4'-thiodiphenol (TDP) to provide improved moldability, color, shrink resistance and resistance to thermal oxidation.

2. Brief Description of the Prior Art

Thermotropic liquid crystalline polymers are thermoplastic materials which can be melt processed to yield products of exceptionally high performance characteristics. Key advantages of these materials are:

Outstanding melt processability, even in thin sections and in intricate components.

Extremely high strength and modulus,

High impact strength coupled with high temperature capability,

Excellent chemical resistance, even at high temperatures,

Excellent dimensional stability, including a near zero coefficient of thermal expansion and low moisture adsorption.

A more detailed review of properties, applications and markets has recently been published by J. R. Dole, Chemtech., 17, 242 (1987).

Thermotropic LCP's are made predominantly with aromatic moieties containing para linkages. They are basically modifications of 1,4-phenylene polyesters or polyesteramides. The parent polymers, polyhydroxybenzoic acid (PHBA), poly(1,4-phenylene terephthalate) (P(HQ/TA)), and poly(1,4-phenylene terephthalic esteramide) (P(AP/TA)) are too high melting and crystalline to be processable. Their melting points (Tm) are in the range of 600° C. A P(HBA/TA/HQ) (50/25/25) copolymer still has a Tm in 1980. The latter two approaches have an advantage over the first two approaches in that the linear nature of the polymer chain is retained which leads to preservation of liquid crystallinity and the development of better physical properties. However, the cost of the monomers used in these approaches to achieve the desired property modification, is generally high.

Commercial LCP's, sold under the trade marks Vectra, (Hoechst-Celanese) and Xydar, (Amoco Chemicals, Inc.), use the third approach with comonomers based on 2,6-naphthalene, poly(p-oxybenzoate-co-2,6-oxynaphthoate), and p,p'-phenylene, poly(p,p'-biphenylene terephthalate co-p-oxybenzoate), respectively. More recent commercial entries, Dupont's HX series and Granmont's Granlar, use the fourth approach and are believed to be poly(p-phenylene-terephthalates) based on phenylhydroquinone and 1-phenethylhydroquinone respectively.

The structure property relationships in LCP'S containing the structural variations mentioned in Table I have recently been reviewed in the paper by W. J. Jackson, Jr. as well as by a number of others earlier (e.g., J. Jackson, Jr., Brit.Poly.J., 154–162, December 1980, D. R. Wilson and S. R. Jones, Symp. Proc., "Polymers in the Service of Man", Div. of Ind. & Eng. Chem., Am. Chem. Soc., 78–85, June 9–11, 1980, and G. W. Calundann and M. Jaffe, Proceedings of the Robert A. Welch Foundation, Conference on Chemical Research XXVI, Synthetic Polymers, Houston TX, 247–287 (1982)).

The use of BPA as a flexible monomer to reduce melting point has been well reported in the literature. Jackson, Jr. (Brit. Poly.J., 154–162, December 1980) reports that BPA is effective in reducing the polyester melting point but is particularly unsuitable in that liquid crystallinity is lost and physical properties much reduced in an HBA/TA/BPA (54/23/23) polyester. In general, bisphenols with one atom linking the aromatic rings are recognized as reducing liquid crystallinity.

Griffin and Cox have also noted the greater disruptiveness of BPA vs TDP in other liquid crystalline polymers. Additionally, J.-I. Lin, S. Antoun, C. Ober and R. W. Lenz, Brit.Poly.J., 132–146, December 1980, disclose the effect of BPA and other bisphenols in reducing the liquid crystallinity of polyesters based on chlorohydroquinone and TA. Liquid crystallinity was retained at up to 20 mole % BPA while with TDP up to 30 mole % could be tolerated. With a series of polymers based on methylhydroquinone and TA they showed that there was no liquid crystallinity at 25 mole % BPA. BPA also reduced Tm slightly more than TDP. Thus, up to about 25 mole % BPA can be tolerated in 1,4-phenylene LCP systems. However, when other monomers are also used to depress Tm less BPA can be tolerated.

As disclosed in U.S. Pat. No. 3,637,595, BPA has been used to improve the heat distortion temperature (HDT) of their liquid crystalline polymer based on HBA, HQ and IA. IA is used to reduce processing temperature of the polyphenylene polyester but results in a very low HDT. As shown in Table II Tg is significantly increased by levels of BPA below 5 mole % but that above this point melts which were anisotropic become isotropic.

TABLE II

| COPOLYESTER OF HBA/IA/HQ/BPA | | | | | | |
|---|---|---|---|---|---|---|
| Mole % | | | | | | Anisotropic |
| HBA | IA | HQ | BPA | Tm °C. | Tg °C. | Melt |
| 33.3 | 33.3 | 33.3 | — | 333 | 110 | Yes |
| 33.3 | 33.3 | 30.0 | 3.3 | 320 | 175 | Yes |
| 33.3 | 33.3 | 28.3 | 5.0 | 315 | 181 | Yes |
| 33.3 | 33.3 | 26.6 | 6.7 | — | 190 | No |
| 50.0 | 25.0 | 25.0 | — | 360 | 115 | Yes |
| 50.0 | 25.0 | 20.0 | 5.0 | 360 | 190 | Yes |

Physical properties for the first composition in the Table are tensile strength 17,800 psi, elongation 10 % and notched Izod of 2.5 which shows that very high physical properties are attained even when considerable kinking monomer (IA) is used, as long as the melt is still liquid crystalline.

Polyesteramides formerly derived from polymerization of an aminophenol (as opposed to a bisphenol) with a dicarboxylic acid are of particular interest because of the potential for improved strength and toughness due to interchain hydrogen bonding. While structurally similar polyamides are much higher melting than their polyester analogues, the polyesteramides melt in the same vicinity as the polyesters and possibly even lower. This is excess of 500° C. Modification of these polymers by copolymerization with monomers having the structural units of the types shown in Table I has resulted in polymers with reduced Tm's which can be melt process.

TABLE I
MODIFYING STRUCTURAL UNITS FOR REDUCED MELTING TEMPERATURE

| STRUCTURE TYPE | EXAMPLES |
| --- | --- |
| (1) Flexible Linkages, | 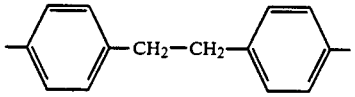 |
| (2) Nonlinear Linkages, | 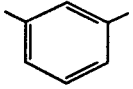 |
| (3) Other Rigid Units With Linearly Opposed Linkages, | 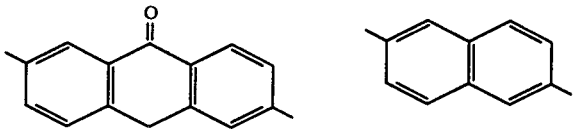 |
| (4) Linear Linkages With Asymmetric Substituents. | 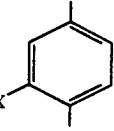 where X = Cl, Ph, Me tBu, PhEt. |

More importantly, depending on the type and amount of modification many of these copolymers retain order in the molten state, i.e., are thermotropic LCP, which leads to most of the property advantages mentioned above. The presence of alkylene or alkyleneoxy spacers between aromatic rings such as in the first approach, or halogen or alkyl substituents such as in the last approach, however, limits the thermal and oxidative stability of LCP's as disclosed in W. J. Jackson, Jr., *Mol.-Cryst. Liq.Cryst.*, 169, 23–49 (1989). Use of non-linear linkages as in the second approach are known to rapidly decrease liquid crystallinity as is also disclosed by W. J. Jackson, Jr., and B. P. Griffin and H. K. Cox, *Brit.-Poly.J.*, 154–162, December believed due in part to the head-to-head or head-to-tail arrangement that the aminophenol residues may assume relative to each other which would lower crystallinity. Thus, for example, the softening points and melt behavior of some polyesteramides derived from p-aminophenol and the isostructural polyesters from hydroquinone are compared in Table III.

TABLE III
P-AMINOPHENOL AND HYDROQUINONE DERIVED POLYMERS

| DICARBOXYLIC ACID | SOFTENING POINTS °C. | | MELT BEHAVIOR |
| --- | --- | --- | --- |
| | POLYESTER-AMIDE | POLY-ESTER | |
| 2-Methoxyterephthalic | 155 | 254 | Anisotropic |
| 2-Butoxyterephthalic | 205 | 270 | Anisotropic |
| p-Carboxyphenoxyacetic | 330 | 355 | Anisotropic |
| p-Biscarboxymethoxybenzene | 210 | 210 | Isotropic |

U.S. Pat. No. 3,398,212, to Jackson, Jr. et al, discloses the use of thiodiphenol and/or variously substituted thiodiphenols as a comonomer to impart oxidative stability to polycarbonates and polyesters derived from bisphenols and diacids where at least 10 mole % of the bisphenols contain a "saturated bicyclic atomic-bridged hydrocarbon ring member". The use of such bicyclic structures introduces secondary and tertiary saturated hydrocarbon groups into the polymer and increases the polymer softening and melting temperatures. These groups are much prone to oxidative degradation and typically require the use of antioxidants. The patent recognizes that while it has been proposed to use thiodiphenol in polymers, such polymers may have poor thermal properties, such as poor glass transition temperature. The use of equimolar amounts of TDP and BPA was noted as resulting in a polymer having a glass transition temperature of only 125° C. and it is recognized that there is a need in the industry for polycarbonates and polyesters which have improved oxidative stability and good tensile and thermal properties. In *The British Polymer Journal*, December 1980, pages 154–162, patentee Jackson, Jr. discusses approaches to reducing the high melting points of rod-like polyesters. The effectiveness of modifiers in reducing the polyester melting points has been found. However, the tensile and flexural properties and liquid crystallinity was found to generally decrease as the amount of modifier was increased, with BPA being particularly bad in this respect.

U.S. Pat. No. 4,219,629 to Storm, discloses copolyesters of hydroxybenzoic acid with a thiodiphenol and an aromatic dicarboxylic acid. The purpose of including the thiodiphenol is to make the hydroxybenzoic acid polymer soluble and more flexible. Solubility was particularly desired so that coatings of substrates could be made. The patent in addition to 4,4'-thiodiphenol, discloses 3,3'-thiodiphenol and 3,4'-thiodiphenol as well as the monoesters and diesters of such compounds.

U.S. Pat. No. 4,477,647 to Mark discloses the use of thiodiphenols in polyarylate resins to achieve flame retardancy and improved impact strength. No mention is made of any improvements in oxidative stability (other than flame retardancy).

U.S. Pat. Nos. 4,678,825, 4,680,371, 4,803,236, and 4,829,113 to Rosenfeld relate to the stabilization of polyesters resulting from the polymerization of terephthalic- /isophthalic acids with bishydroxyphenyl compounds. The preferred bishydroxyphenyl compound is Bisphenol A, and others are disclosed, including 4,4'-thiodiphenol, and combinations of bisphenols. The patents discuss the problem of oxidative stability with aromatic polyesters derived from bisphenols and dicarboxylic acids. The specific problems noted are of discoloration and depolymerization resulting from exposure to the high temperatures (ranging up to 400° C.) encountered in melt polymerization and processing. The patent does not distinguish between the bishydroxyphenols which might be used and their relative needs for stabilization. Additives included in the patents for improved stability are: 2,5-(dimercapto)-1,3,4-thiadiazole, 2-mercaptobenzthiazole, triphenylphosphite, a diphosphite based on Bisphenol A, and a mixture of the latter phosphite and poly(phenylene oxide).

U.S. Pat. No. 4,075,173 to Haruyama is a process patent for the solid state molecular weight advancement of a prepolymer. The patent fails to recognize either the criticality of the composition of the instant invention or the benefit of including 4,4'-thiodiphenol with Bisphenol A to improve oxidative stability. The patent discloses ranges of hydroxybenzoic acid to Bisphenol A of 1:100 to 100:1 in combination with terephthalic and/or isophthalic acid. The disclosure further indicates that part of the diacetate of Bisphenol A may be replaced by a small amount of other bisphenols among which are listed hydroquinone, bis(4-hydroxyphenyl)sulfone and bis(4-hydroxyphenyl)thioether. Neither preferred compounds nor ratios of compounds is disclosed which address the problems noted by Jackson, Jr..

SUMMARY OF INVENTION

Liquid crystalline aromatic polyesters and polyesteramides have been discovered which when modified with Bisphenol A (BPA) in combination with thiodiphenol (TDP), have improved moldability, color and resistance to thermal oxidation and shrinkage. Liquid crystalline polyesters are generally 1,4-phenylene polyesters to which other monomers have been added to reduce the melting properties to a useful range. BPA is a desirable comonomer due to its low cost but an accompanying lowering of thermal stability has until now limited its usefulness. A class of liquid crystal polymers (LCP'S) have now been produced, which compared to XYDAR or VECTRA brand of LCP's, have lower cost.

Surprisingly, this was accomplished by using a special combination of low cost raw materials. The high raw material cost of XYDAR is due to the high cost of biphenol (about $5.00/lb.) which is 25 mole % of the composition. The high raw material cost of VECTRA is due to the high cost of 6-hydroxy-2-naphthoic acid (about $5.00/lb.) which is 25 mole % of the composition. Although the use of BPA ($0.70/lb.) with terephthalic acid ($0.37/lb.) would achieve a cost reduction, BPA is known to reduce thermal stability and in some instances to destroy liquid crystallinity.

In accordance with the present invention, a thermotropic liquid crystalline polymer composition is provided having the general formula:

—(CO—C$_6$H$_4$—O)$_m$—(CO—C$_6$H$_4$—CO)$_n$

—(O—C$_6$H$_4$—X)$_p$—(O—C$_6$H$_4$—C(CH$_3$)$_2$—C$_6$H$_4$-O)$_q$—(O—C$_6$H$_4$—S—C$_6$H$_4$O)$_t$— where aromatic substituents are para to one another, where —X— can be either —O— or —NH—, and m,n,p,q,t are mole fractions totaling 1.0, where
 m is 0 to 0.75,
 n is 0.125 to 0.5,
 p is 0 to 0.375,
 q plus t is 0.125 to 0.25, and
 n equals p plus q plus t,
 m plus 2p is 0.5 to 0.75,
 t is greater than 0.0125, but equal to no greater than 90 % of q plus t.

Preferably X is —O—, m is from 0.5 to 0.75 and p is less than 0.05. Alternatively, m is less than 0.1 and p is from 0.25 to 0.375.

The thermotropic liquid crystalline polymer composition is the reaction product of the copolymerization of:

a) p-Hydroxybenzoic acid,
b) a member selected from the group consisting of hydroquinone and p-aminophenol,
c) Bisphenol A,
d) 4,4'-thiodiphenol, and
e) terephthalic acid, where substantially all aromatic substituents are para to one another, and wherein the thiodiphenol is present in an amount at least equal to 1.25 mole % of the total composition, the Bisphenol A is present in an amount at least equal to 12.5 mole %, and the concentration of the thiodiphenol plus Bisphenol A is up to about 25.0 mole %.

BRIEF DESCRIPTION OF THE DRAWINGS

The objects and advantages of the instant invention will become apparent when the specification is read in conjunction with the drawings, wherein:

FIG. I is a composition map of the copolymers and thermal properties;

FIG. II is a graph showing the thermal decomposition temperature of BPA containing polymers with varying levels of TDP; and, FIG. III is a graph illustrating the Brabender rheology data.

DETAILED DESCRIPTION OF PREFERRED EMBODIMENTS

The polymers on which this invention is based are modifications of copolymers prepared from the monomers HBA, TA, HQ and BPA. Compositions using these monomers are graphically shown in FIG. I. As TA must be present in equal molar amounts to the bisphenols a graph with triangular coordinates suits the purpose. The two coordinates for the bisphenols include equimolar amounts of TA, i.e., the three apexes of the triangle are TA/HQ (50/50), TA/BPA (50/50) and HBA (100).

Not all compositions shown in the FIG. I, are processable or have the outstanding properties associated with liquid crystallinity. Polymer melting temperature (Tm) and softening (or glass transition) temperature (Ts) data from the literature are displayed on the graph. Those areas known or expected to represent isotropic compositions and those known or expected to be too high melting for melt processing are shaded. The remaining area covers the range of compositions of potential interest to the invention. These composition can generally be described as polymers based on the following molar ratios of monomers:

$$(HBA)_X(TA)_Y(HQ)_Z(BPA)_{ZZ}$$

where

X = about 0 to 0.75
Y = about 0.125 to 0.50
Y = Z + ZZ
Z = about 0 to 0.375
ZZ = 0.125 to 0.25
X + 2Z = 0.50 to 0.75

The principal modification to these compositions is the use of an antioxidant monomer TDP which imparts greater oxidative stability to the compositions. Thio compounds are generally known to be antioxidants and are believed effective by decomposing hydroperoxides which interrupt the initiation step leading to chain propagating radicals TDP is used in combination with BPA and is effective at concentrations above 1.25 mole % of the total composition.

Other antioxidant monomers which were considered to be of potential interest were the 4,4'-bishydroxyphenyl compounds listed in TABLE IV.

TABLE IV

POTENTIAL BISHYDROXYPHENYL ANTIOXIDANT MONOMERS

| COMPOUND | RING SUB-STITUENTS | BRIDGING GROUP |
|---|---|---|
| IRGANOX 245[a] | 2,2'-DI-t-BUTYL 6,6'-DIMETHYL | 4,4'-ALIPHATIC DIESTER |
| CYANOX 425[b] | 2,2'-DI-t-BUTYL 5,5'-DIETHYL | 4,4'-METHYLIDENE |
| ETHANOX 322[c] | 2,2'-DI-t-BUTYL 6,6'-DIMETHYL | 4,4'-THIO |
| SANTANOX[d] | 2,2'-DI-t-BUTYL 5,5'-DIMETHYL | 4,4'-THIO |

[a]Triethyleneglycol bis[3-(3'-t-butyl-4'-hydroxy-5'-methylphenyl)propionate]
[b]bis(2-t-Butyl-5-ethyl-4-hydroxyphenyl)methane
[c]2,2'-Di-t-butyl-6,6'-dimethyl-4,4'-thiodiphenol
[d]2,2'-Di-t-butyl-5,5'-dimethyl-4,4'-thiodiphenol However, only TDP proved to be acceptable in polymer preparation and in conferring increased stability as evidenced by molecular weight advancement, infrared spectroscopy and color. As shown, the monomers were hindered tisphenols and thio containing bisphenols. Hindered bisphenols are used extensively as antioxidants and are believed effective due to interruption of the propagation step via hydroxyl hydrogen atom transfer to a peroxy radical (C. S. Abramoff, "Antioxidants", Modern Plastics Encyclopedia, 58 (10A), 144-145 (1981-2). It is thus likely that such hindered bisphenols as comonomers will only be effective antioxidants when present as end groups. As mentioned above thio compounds are believed effective due to interruption of the initiation step by decomposing hydroperoxides and would not need to be present as an end group.

Model reactions were run with TA and TDP and with the above identified antioxidant monomers under typical acidolysis polymerization conditions to test both the reactivity and thermal stability of the bisphenols. The ortho hindering groups on the bisphenols (2,2'6,6'-substituents) can impede the rates of acetylation and acidolysis reactions although any final polymer should be an equilibrium transesterified product in the melt.

TABLE V

MODEL REACTIONS OF ANTIOXIDANT MONOMERS

| MONOMER | DUMP °C.[a] | Tm °C. |
|---|---|---|
| IRGANOX 245 | 368 | 94 |
| " | 275 | — |
| CYANOX 425 | 310 | 52 |
| ETHANOX 322 | 300 | 60 |
| SANTANOX | 330 | 171 |
| THIODIPHENOL | 280 | 304 |

[a]Dump temperature is the temperature at which the reaction was stopped.

The melting temperatures shown in Table V indicate polymeric materials were not obtained for the first four materials. Only thiodiphenol (TDP) gave a polymer which could be advanced further to a high MW polymer (Tm=378° C.). All of the other bisphenol monomers showed evidence of reaction with TA as indicated by disappearance of TA and solubility of the resulting products in acetone. However, TDP was the only monomer whose use did not result in severe discoloration at temperatures of about 300° C. As expected none of these prepolymers showed evidence of liquid crystallinity. By infrared spectroscopy the Santanox and TDP reactions were the only ones which showed a near total disappearance of hydroxyl function although all indicated the presence of aromatic acetate. Only the reaction with TDP showed the presence of a strong aromatic ester absorption although the Santanox product had a medium aromatic ester absorption. The lack of total disappearance of hydroxyl is believed due to more than just a lower reactivity. Dealkylation reactions are known to occur under polymerization conditions for alkylated phenols and are believed to be the limiting feature. (Kirk Othmer Encyclopedia of Chemical Technology, 3rd ed.,John Wiley & Sons, New York, vol.2, p.85-86, 1978.)

The foregoing results establish the criticality of the use of TDP as an antioxidant monomer in the liquid crystalline polymers of this invention.

Other monomers can also be incorporated at low levels (0-10%) to depress the melting point to a processable range. Examples include isophthalic acid, 2,6-naphthalenedicarboxylic acid which can be used in place of TA, resorcinol or 2,6-naphthalenediol which can be used in place of HQ or BPA, and m-hydroxybenzoic acid which can be used in place of HBA.

Polymers are most conveniently prepared by an in situ acetylation of the monomers with excess acetic anhydride followed by an acidolysis polymerization to low HW prepolymer which is isolated, ground to a fine powder and then solid state advanced to the final polymer. Catalysts such as sodium phosphate as more fully set forth in U.S. Pat. Nos. 4,377,681, and 4,444,980, magnesium and antimony oxide as more fully set forth in U.S. Pat. No. 4,118,372, and dibutyltin oxide as more fully set forth in U.S. Pat. No. 4,067,852 can optionally be used.

Polymer Tm increases significantly during advancement, and advancement is carried out in steps of increasing temperature either in vacuo or under a flow of nitrogen. Care is taken to keep the temperature below the point where particles coalesce but high enough to advance polymerization. The rate of advancement becomes dependent on diffusion of acetic acid from the polymer and is thus very dependent on particle size, Tg of the polymer, temperature and vapor concentration of acetic acid.

Alternative methods of polymerization include the same polymerization as above but starting with acetates or other esters of the phenols, interfacial polymerization staring with acid chlorides of the acids, or condensation reactions between the phenols and phenol esters of the acids.

A number of polymer compositions were prepared as shown in Table VI.

Thermal gravimetric analyses in air at 10° C./min were used on a number of these samples to measure improvements in thermal stability. Comparisons were made of temperatures where weight losses of 5 and 10% were achieved for samples with and without TDP. The data is seen in Table VII.

TABLE VI

POLYMER COMPOSITIONS

| CODE[a] | MOLE PERCENT | | | | | | THERMAL PROPERTIES | | |
|---|---|---|---|---|---|---|---|---|---|
| | HBA | TA | HQ | BPA | TDP | IA | Ts | Tm | Td |
| E | 50 | 25 | 12.5 | 12.5 | — | — | 401 | 433 | 442 |
| E[X] | 50 | 25 | 12.5 | 6.25 | 6.25 | — | 372 | 411 | 432 |
| G | 50 | 25 | 7.5 | 17.5 | — | — | 393 | 410 | 434 |
| G[X] | 50 | 25 | 7.5 | 11.5 | 6.25 | — | 394 | 423 | 412 |
| I | 50 | 25 | — | 25 | — | — | 403 | 420 | 432 |
| I[XH] | 50 | 20 | — | 20 | 5 | 5 | 390 | 411 | 422 |
| J[X] | 60 | 20 | 5 | 10 | 5 | — | 389 | 412 | 429 |
| K | 60 | 20 | 5 | 15 | — | — | 384 | 420 | 439 |
| K[X] | 60 | 20 | 5 | 10 | 5 | — | 387 | 407 | 433 |
| L | 60 | 20 | — | 20 | — | — | 378 | 397 | 431 |
| L[X] | 60 | 20 | — | 15 | 5 | — | 384 | 415 | 425 |
| L[XL] | 60 | 17.5 | — | 15 | 5 | 2.5 | 386 | 414 | 438 |
| L[YL] | 60 | 17.5 | — | 12.5 | 2.5 | 2.5 | 368 | 411 | 435 |
| L[ZL] | 60 | 17.5 | — | 11.75 | 1.25 | 2.5 | 334 | 390 | 428 |
| M | 40 | 30 | 15 | 15 | — | — | 384 | 415 | 447 |
| N[XH] | 25 | 32.5 | 12.5 | 20 | 5 | 5 | 288 | 381 | 407 |
| O | — | 50 | 25 | 25 | — | — | 331 | 354 | 418 |
| O[X] | — | 50 | 25 | 20 | 5 | — | 365 | 389 | 425 |
| O[XH] | — | 45 | 25 | 20 | 5 | 5 | 360 | 365 | 391 |
| O[XL] | — | 47.5 | 25 | 20 | 5 | 2.5 | 332 | 358 | 407 |

[a]superscript
X = 5-6.5% TDP,
Y = 2.50% TDP,
Z = 1.25% TDP,
H = 5.0% IA, and
L = 2.5% IA.

TABLE VII

THERMAL GRAVIMETRIC ANALYSES
EFFECT OF TDP-WEIGHT LOSS IN AIR

| CODE | MOLE RATIO | | | WT. LOSS TEMP. °C. | | ADVANTAGE °C. |
|---|---|---|---|---|---|---|
| | BPA | HQ | TDP | 5% | 10% | TDP (5/10%) |
| E | 50 | 50 | — | 449 | — | |
| E[X] | 25 | 50 | 25 | 481 | — | +32/— |
| G | 70 | 30 | — | 458 | — | |
| G[X] | 45 | 30 | 25 | 463 | — | +5/— |
| K | 75 | 25 | — | 417 | 435 | |
| K[X] | 50 | 25 | 25 | 432 | 448 | +15/13 |
| L | 100 | — | — | 412 | 429 | |
| L[X] | 75 | — | 25 | 425 | 439 | +13/10 |
| L[ZL] | 94 | — | 6 | 412 | 428 | −0/1 |
| L[YL] | 87.5 | — | 12.5 | 425 | 436 | +13/7 |

TABLE VII-continued

THERMAL GRAVIMETRIC ANALYSES
EFFECT OF TDP-WEIGHT LOSS IN AIR

| CODE | MOLE RATIO | | | WT. LOSS TEMP. °C. | | ADVANTAGE °C. |
|---|---|---|---|---|---|---|
| | BPA | HQ | TDP | 5% | 10% | TDP (5/10%) |
| L[XL] | 75 | — | 25 | 417 | 429 | +5/0 |
| O | 50 | 50 | — | 403 | 423 | |
| O[X] | 40 | 50 | 10 | 409 | 429 | +6/6 |
| O[XH] | 40 | 50 | 10 | 420 | 433 | +17/10 |

TGA's run at 10° C./min. Weight loss temperature are for weight losses occurring after 325° C.

All samples containing TDP show a higher temperature for weight loss except the sample containing only 1.25 mole % TDP (Sample Code L[ZL]). This data proves a greater stability towards oxidative weight loss in BPA compositions when more than 1.25 mole % TDP is present as a co-ingredient. However, it could be argued that decreasing BPA, by replacement with TDP, would improve thermal stability. FIG. II destroys this argument. Td's (temperature at 5 wt. % loss) versus mole % of BPA are displayed and the mole % of TDP is shown by the indicated symbols. The lower line is from a regression analysis of the points for polymer with 0% and 1.25 mole % TDP. The upper line is from a linear regression analysis of polymers with 2.5 and 5.0 mole % TDP. The significantly higher decomposition temperature for compositions represented by the latter line shows a greater stability for samples containing more than 1.25 mole % TDP even when BPA content is not reduced. The first four entries in Table VII are not included as they were collected under different conditions. TGA's in oxygen environments are very dependent upon sample configuration and gas flow.

Samples containing TDP are also generally noted to be lighter in color and more resistant to discoloration.

A further measure of improved oxidative stability was obtained during measurement of melt viscosities on a Brabender. Table VIII summarizes rheology data obtained for the samples of all compositions "L" and "OXH" which were tested. As shown the worst decomposition was observed in sample "L" (no TDP) and sample "LZL" (1.25% TDP) also foamed badly. This corresponds very well to the noted relative stabilities from the TGA data.

The liquid crystalline nature of the melts was obvious from the fibrous nature (resembling wood) of samples taken from the melt. The strong shear rate dependence of viscosity in the melt is also an indication of liquid crystallinity. A log-log plot of torque/RPN vs RPH is equivalent to a log-log plot of viscosity vs shear rate and is shown in FIG. III. Shear rate for the particular mixing head ranged from 74 to 636 sec$^{-1}$ (20–180 RPM respectively).

TABLE VIII

BRABENDER RHEOLOGY DATA

| SAMPLE | CODE | RPM | TORQUE | TORQUE/RPM | TEMP °C. | REMARKS |
|---|---|---|---|---|---|---|
| 238-30 | L | 20 | 200 | 10.0 | 397 | |
| | | 40 | 220 | 5.5 | 400 | |
| | | 80 | 250 | 3.1 | 406 | |
| | | 160 | 300 | 1.8 | 413 | Worst foaming. |
| 235-34 | L[X] | 20 | 580 | 29.0 | 401 | |
| | | 80 | 600 | 7.5 | 419 | Smoking. |
| 238-13 | L[XL] | 20 | 320 | 16.0 | 397 | |
| | | 40 | 380 | 9.5 | 402 | |
| | | 80 | 430 | 5.4 | 410 | Smoking, |
| 238-26 | L[YL] | 20 | 320 | 16.0 | 410 | |
| | | 185 | 420 | 2.3 | 440 | Decomp. - |

TABLE VIII-continued

| | | BRABENDER RHEOLOGY DATA | | | |
|---|---|---|---|---|---|
| SAMPLE | CODE | RPM | TORQUE | TORQUE/RPM | TEMP °C. | REMARKS |
| 238-28 | $L^{ZL}$ | 20 | 120 | 6.0 | 395 | Foamed badly, fluxed quick |
| 235-46 | $O^{XH}$ | 20 | 150 | 7.5 | 403 | |
| | | 185 | 290 | 1.6 | 418 | Some decomp. |

Nonliquid crystalline polyesters such as polyethylene terephthalate are reported in W. J. Jackson, Jr. et al. *Polymer Preprints*, 30, (2), 487-8 (1989) to have an almost constant viscosity over this range of shear rates at 300° C.

Small samples of polymers described in Table VI were injection molded on a Whatman-Stillman press. While ah effect of TDP upon physical properties was not apparent there was a definite benefit observed in the molding of samples containing TDP. There is better mold release, less mold shrinkage, less cracking and less crazing observed. During molding, with samples containing TDP small tensile bars were removable from the mold, but in the absence of TDP a large portion of the small tensile bars either broke in the mold or while being removed from the mold. Some shrinkage occurred with all samples, but cracks were more likely with moldings of more shrinkage.

EXAMPLES

The following monomers and reagents were used in sample preparations.

| Chemical | Manufacturer | Purity |
|---|---|---|
| p-Hydroxybenzoic acid | Napp Chemical | Polymer Grade |
| Hydroquinone | Aldrich | 99% |
| Bisphenol A | Dow | 99% |
| Thiodiphenol | Crown Zellerbach | |
| Acetic Anhydride | Mallinckrodt | 97% |
| Terephthalic Acid | Amoco | 99% |
| N-acetyl-p-aminophenol | American Tokyo Kasei | 99% |

Hot Bar Thermal Properties—An aluminum clad iron core temperature bar was used for the Ts, Tm, and Td measurements. The bar was heated at one end by a 1000 watt 240 volt cartridge heater, creating a thermal gradient along the bar. The powdered polymer being tested was spread along the bar, and the behavior of the polymer was observed. The place at which the polymer sticks to the bar was taken as the softening point, Ts. The melting point, Tm, was the place where the polymer looks wet and shiny. The decomposition point was the place where the polymer turns black in 5 minutes. The temperature at those places was measured with a surface pyrometer, and was reported as Ts, Tm, and Td.

EXAMPLE 1

This example corresponds to polymer composition coded "L". Into a 2 liter glass resin kettle equipped with a stirrer, thermometer, $N_2$ purge, reflux and take off condenser were placed 368.0 g (2.664 moles) of p-hydroxybenzoic acid, 147.5 g (0.888 moles) of terephthalic acid, 202.7 g (0.888 moles) of Bisphenol A and 500 g (4.90 moles) of acetic anhydride (molar ratios of 60:20:20:110 respectively). The mixture was heated under reflux with stirring for 4 hours. The temperature was then slowly increased at a rate of about 7° C./10min as acetic acid, which was formed in the acetylation, was distilled off followed by the excess acetic anhydride and acetic acid formed in the polymerization reaction. The reaction mixture became pearlescent above about 275° C. and the pearlescence was found to disappear when stirring was briefly stopped. As the reaction temperature approached 300° C. melt viscosity was increasing rapidly, while the amount of acetic acid liberated was small. At 310° C., 516 ml of distillate had been collected and the molten prepolymer was poured on to an aluminum foil sheet and allowed to cool and harden. The light tan prepolymer weighing, 615 g, was then broken up and ground into a powder using a laboratory mill. The hot bar softening temperature was 153° C. and the melting temperature was 163° C.

The ground prepolymer was first partially advanced in glass trays in a vacuum oven. Under vacuum, temperature of the oven was raised from about 140° C. to 235° C. at the rate of 8° C. per hour. The polymer powder remains free flowing, and was light tan at the end of this step. The partially advanced polymer was then transferred to a stainless steel tube, and heated at 10° C. per hour from a starting temperature of 235° C. to a temperature of 340° C. under a nitrogen stream. The resulting polymer was gold colored, had a hot bar softening temperature of 378° C. and a hot bar melting temperature of 397° C.

Thermal gravimetric analysis of advanced polymer at 10° C./min in air showed a 5 % wt. loss at 412° C. and a 10% wt. loss at 429° C.

Melt rheology of a 60 g sample was measured using a Brabender PV-100 Plasti-Corder with an electrically heated 60cc Roller 6 head. The temperature was held at about 400° C. with digital controllers. The mix head speed was held at 20 RPM for five minutes and had a measured torque of 200. Torque is measured in meter grams and can be converted to poise by first dividing by the RPM and then multiplying by 398.Doubling of the RPM to 40, and after two minutes to 80 and after another two minutes to 160 resulted in measured torques of 220, 250 and 300 respectively. Temperature of the melt began to exceed the controlling temperature after reaching 80 RPH and at 160 RPM the melt temperature was 413° C. whereupon the sample was smoking and foaming badly. A recovered sample was dark brown in color, contained bubbles and was fibrous in nature.

Small test samples were molded on a Watson-Stillman 1 oz piston type injection molding machine at a temperature of about 365° C. and an injection pressure of 1500 psi. The molds were preheated on a hot plate set at 175° C. A test bar had a tensile strength of 4577 psi and a flex strength of 5610 psi.

EXAMPLE 2

This example corresponds to polymer composition coded "$L^X$". The same procedure described in Example 1, was followed except that 48.5 g (0.222 moles) of 4,4'-thiodiphenol were used in place of 50.7 g (0.222 moles) of the Bisphenol A. The molar ratios of p-hydroxybenzoic acid to terephthalic acid to Bisphenol A to 4,4'-thiodiphenol are thus 60:20:15:5 respectively.

The molten prepolymer was poured off at 300° C. after 522 ml of distillate had been collected. The light tan prepolymer weighed 656 g, had a hot bar softening temperature of 133° C. and a melting temperature of 163° C. After advancement the softening and melting temperatures were 384° and 415° C. respectively. The polymer was a lighter gold color than the sample from Example 1.

Thermal gravimetric analysis of advanced polymer at 10° C./min in air showed a 5 % wt. loss at 425° C. and a 10% wt. loss at 439° C.

On measuring melt viscosity using the Plasti-Corder an initial torque of 580 was measured at 20 RPM. On increasing the RPH to 80 sample temperature had risen to 419° C. at which temperature the sample began to smoke. The lack of foaming as opposed to the foaming observed at 413° C. for the sample in Example 1 is a measure of improved thermal stability. The higher melt viscosity as indicated by higher torque and a higher temperature rise at 80 RPM is probably due to a higher molecular weight. A recovered sample had a fibrous appearance and was light brown in color.

A small test sample molded at 370° C. had a tensile strength of 5000 psi and a flex strength of 7100 psi. Compared to Example 1 molded test samples were whiter in color and were more easily removed from the molds.

EXAMPLE 3

The same general procedure of Example 1 is followed using 369.1 g (2.222 moles) of terephthalic acid, 167.9 g (1.111 moles) of N-acetyl-p-aminophenol, 253.6 g (1.111 moles) of Bisphenol A and 500 g (4.90 moles) of acetic anhydride (molar ratios of 50:25:25:110 respectively). The molten prepolymer is poured off at 300° C. after about 525 ml of distillate is collected. The tan colored polymer is advanced to a final temperature of 340° C. to give a brownish looking powder. The sample is molded into test bars at about 370° C.

EXAMPLE 4

The procedure of Example 3 is followed except that 48.5 g (0.222 moles) of 4,4'-thiodiphenol are use in place of 50.7 g (0.222 moles) of the Bisphenol A. The molar ratios of terephthalic acid to p-aminophenol to Bisphenol A are thus 50:25:20:5. The molten prepolymer is poured off after reaching 300° C. and about 530 ml of distillate are collected. The light tan colored prepolymer is advanced to 340° C. The polymer is lighter in color than that of Example 3.

The sample is molded into test bars at about 370° C. The test bars are lighter in color and are more uniform in appearance than those of Example 3.

EXAMPLES 5-22

These examples correspond to polymer compositions coded E, EX, G, GX, I, $I^{XH}$, $J^X$, K, $K^X$, L, $L^X$, $L^{XL}$, $L^{YL}$, $L^{ZL}$, M, $N^{XH}$, O, $O^X$, $O^{XH}$, and $O^{XL}$ respectively. The same general procedure described in Example 1 was followed using the appropriate composition ratios.

What is claimed is:

1. Thermotropic liquid crystalline polymer composition, said polymer composition having recurring moieties represented by the general formula:

—(CO—C$_6$H$_4$—O)$_m$—(CO—C$_6$H$_4$—CO)$_n$—

—(O—C$_6$H$_4$—X)$_p$—(O—C$_6$H$_4$—C(CH$_3$)$_2$—C$_6$H$_4$—O)$_q$—

—(O—C$_6$H$_4$—S—C$_6$H$_4$—O)$_t$— where substantially all aromatic substituents are para to one another,
where
—X— is either —O— or —NH—, and
m, n, p. q. and t are mole fractions totaling 1.0, where
m is 0 to 0.75,
n is 0.125 to 0.5,
p is 0 to 0.375,
q plus t is 0.125 to 0.25,
n equals p plus q plus t,
m plus 2p is 0.5 to 0.75, and
t is greater than 0.0125, but equal to no greater than 90% of q plus t.

2. The thermotropic liquid crystalline polymer composition of claim 1, further comprising up to 10.0 mole % of the total composition of repeating units from a further aromatic comonomer.

3. The thermotropic liquid crystalline polymer composition of claim 1, wherein m is from 0.5 to 0.75 and p is less than 0.05.

4. The thermotropic liquid crystalline polymer composition of claim 1, wherein m is less than 0.1 and p is from 0.25 to 0.375.

5. The thermotropic liquid crystalline polymer composition of claim 1, wherein X is —NH—.

6. The thermotropic liquid crystalline polymer composition of claim 1, wherein X is —O—.

7. The thermotropic liquid crystalline polymer composition of claim 5, wherein m is from 0.5 to 0.75 and p is less than 0.05.

8. The thermotropic liquid crystalline polymer composition of claim 5, wherein m is less than 0.1 and p is from 0.25 to 0.375.

9. The thermotropic liquid crystalline polymer composition of claim 6, wherein m is from 0.5 to 0.75 and p is less than 0.05.

10. The thermotropic liquid crystalline polymer composition of claim 6, wherein m is less than 0.1 and p is from 0.25 to 0.375.

11. Thermotropic liquid crystalline polymer reaction product of the copolymerization of:
a) p-Hydroxybenzoic acid,
b) a member selected from the group consisting of hydroquinone and p-aminophenol,
c) Bisphenol A,
d) 4,4'-thiodiphenol, and
e) terepthalic acid,
wherein the thiodiphenol is present in an amount at least equal to 1.25 mole % of the total composition, the Bisphenol A is present in an amount at least equal to 12.5 mole %, and the concentration of the thiodiphenol plus Bisphenol A is up to about 25 mole %.

12. The thermotropic liquid crystalline polymer composition of claim 11, wherein the mole fractions of the components totals 1.0 and where the mole fraction of hydroxybenzoic acid is 0 to 0.75, of terephthalic acid is 0.125 to 0.5, of hydroquinone or p-aminophenol is 0 to 0.375, and of bisphenol A is 0.125 to 0.25.

13. The thermotropic liquid crystalline polymer composition of claim 12, where thiodiphenol is present in an amount up to about 22.25 mole % of the total composition thereby imparting improved thermal oxidative stability, molding performance and appearance.

14. The thermotropic liquid crystalline polymer composition of claim 11, wherein the member selected from the group consisting of hydroquinone and p-aminophenol, is p-aminophenol.

15. The thermotropic liquid crystalline polymer composition of claim 11, wherein the member selected from the group consisting of hydroquinone and p-aminophenol, is hydroquinone.

16. The thermotropic liquid crystalline polymer composition of claim 11, further comprising up to 10.0 mole % of the total composition of repeating units from a further aromatic comonomer.

17. The thermotropic liquid crystalline polymer composition of claim 11, wherein the mole percent of hydroxybenzoic acid is from 0.5 to 0.75 and hydroquinone plus p-aminophenol is less than 0.05.

18. The thermotropic liquid crystalline polymer composition of claim 15, wherein the mole percent of hydrobenzoic acid is from 0.5 to 0.75 and hydroquinone plus p-aminophenol is less than 0.05.

19. The thermotropic liquid crystalline polymer composition of claim 15, wherein the mole percent of hydrobenzoic acid is less than 0.1 and the mole percent of hydroquinone plus p-aminophenol is from 0.25 to 0.375.

20. Thermotropic liquid crystalline polymer composition having repeating units comprising:

a) $(CO-C_6H_4-O)_m$ b) $(CO-C_6H_4-CO)_n$ c) $(O-C_6H_4-X)_p$ d) $(O-C_6H_4-C(CH_3)_2-C_6H_4-O)_q$ and d) $[(HO-C_6H_4)_2S_l](-O-C_6H_4-S-C_6H_4-O-)_t$ where substantially all aromatic substituents are para to one another, and where —X— is either —O— or —NH—, and m, n, p, q and t are mole fractions totaling 1.0 where
   m is 0 to 0.75,
   m plus 2p is 0.5 to 0.75,
   n is 0.125 to 0.5,
   p is 0 to 0.375,
   q is 0.125 to 0.375, and
   n equals p plus q,
   t is greater than 0.125, but equal to no greater than 90% of q.

21. The thermotropic liquid crystalline polymer composition of claim 20, further comprising up to 10.0 mole % of the total composition of repeating units from a further aromatic comonomer.

22. The thermotropic liquid crystal polymer of claim 20, wherein X is —NH—.

23. The thermotropic liquid crystal polymer of claim 20, where X is —O—.

24. The thermotropic liquid crystalline polymer composition of claim 20, wherein m is from 0.5 to 0.75 and p is less than 0.05.

25. The thermotropic liquid crystalline polymer composition of claim 20, wherein m is less than 0.1 and p is from 0.25 to 0.375.

26. The thermoplastic liquid crystalline polymer composition of claim 22, wherein m is from 0.5 to 0.75 and p is less than 0.05.

27. The thermotropic liquid crystalline polymer composition of claim 22, wherein m is less than 0.1 and p is from 0.25 to 0.375.

28. The thermotropic liquid crystalline polymer composition of claim 23, wherein m plus 2n is from 0.5 to 0.75 and p is less than 0.05.

29. The thermotropic liquid crystalline polymer composition of claim 23, wherein m is less than 0.1 and p is from 0.25 to 0.375.

* * * * *